US008377415B2

(12) United States Patent
Zidan et al.

(10) Patent No.: US 8,377,415 B2
(45) Date of Patent: Feb. 19, 2013

(54) METHODS FOR SYNTHESIZING ALANE WITHOUT THE FORMATION OF ADDUCTS AND FREE OF HALIDES

(75) Inventors: Ragaiy Zidan, Aiken, SC (US); Douglas A. Knight, Aiken, SC (US); Long V. Dinh, Aiken, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 13/313,472

(22) Filed: Dec. 7, 2011

(65) Prior Publication Data

US 2012/0141363 A1 Jun. 7, 2012

Related U.S. Application Data

(60) Provisional application No. 61/420,503, filed on Dec. 7, 2010.

(51) Int. Cl.
*C01B 6/06* (2006.01)

(52) U.S. Cl. ........................ 423/645

(58) Field of Classification Search ........ 429/12, 429/206; 149/37, 43, 46, 61, 109.4; 423/265, 423/274, 645; 526/159; 568/881, 885; 585/250
See application file for complete search history.

(56) References Cited

U.S. PATENT DOCUMENTS

| 3,801,657 | A | | 4/1974 | Scruggs | |
| 3,816,192 | A | | 6/1974 | Brower et al. | |
| 3,840,654 | A | * | 10/1974 | Schmidt et al. | 423/645 |
| 4,006,095 | A | | 2/1977 | Hoffman et al. | |
| 5,670,129 | A | | 9/1997 | Klapdor et al. | |
| 6,251,349 | B1 | | 6/2001 | Zaluska et al. | |
| 6,471,935 | B2 | | 10/2002 | Jensen et al. | |
| 6,617,064 | B2 | * | 9/2003 | Petrie et al. | 429/421 |
| 6,793,909 | B2 | | 9/2004 | Gross et al. | |

OTHER PUBLICATIONS

Paskevicius et al. "Characterisation of mechanochemically synthesidies alane (AIH3) nanoparticles" Journal of Alloys and Compounds, 2009, 487, 370-376.*
Acros catalog "Aluminium Hydrides and Borohydrides" 2008, 1-40.*
M. Paskevicius, DA, Sheppard C.E. Buckley; Characterisation of mechanochemically synthesised alane (A1H3) nanoparticles; Journal of Alloys and Compounds 487 (2009) pp. 370-376.

* cited by examiner

*Primary Examiner* — Wayne Langel
*Assistant Examiner* — Syed Iqbal
(74) *Attorney, Agent, or Firm* — J. Bennett Mullinax, LLC

(57) ABSTRACT

A process is provided to synthesize an alane without the formation of alane adducts as a precursor. The resulting product is a crystallized α-alane and is a highly stable product and is free of halides.

3 Claims, 4 Drawing Sheets

Infrared spectra of α-AlH$_3$ a) pure α-AlH$_3$ from ATK, b) reaction materials after washing with diethyl ether, c) after washing with THF, d) solvent diethyl ether, and e) AlH$_3$2THF adduct.

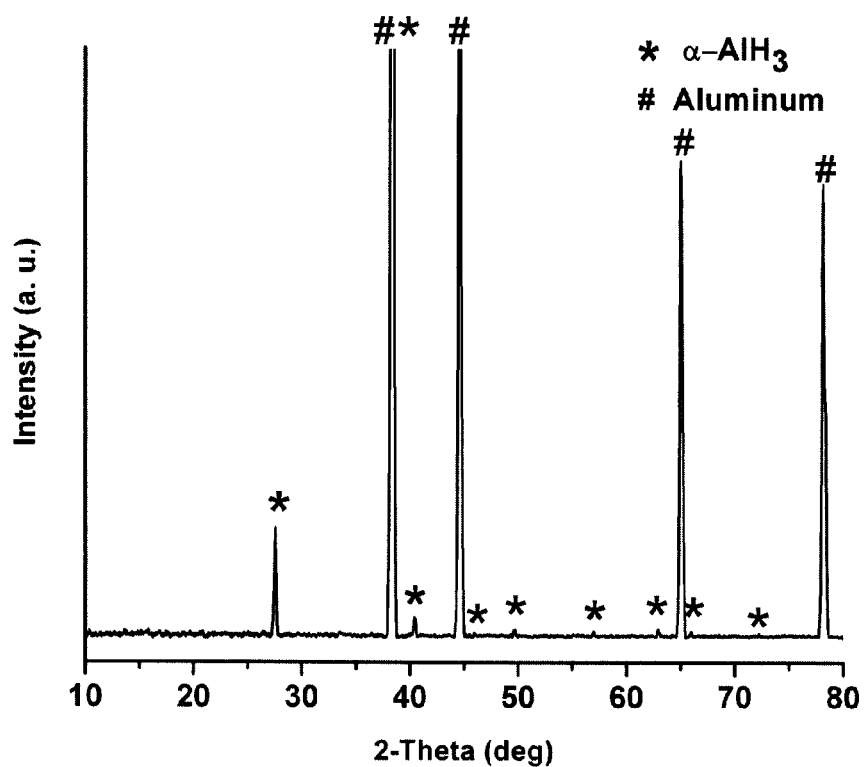
Figure 1 Powder X-ray diffraction of the washed ballmilled sample of LiAlH$_4$ and AlCl$_3$.

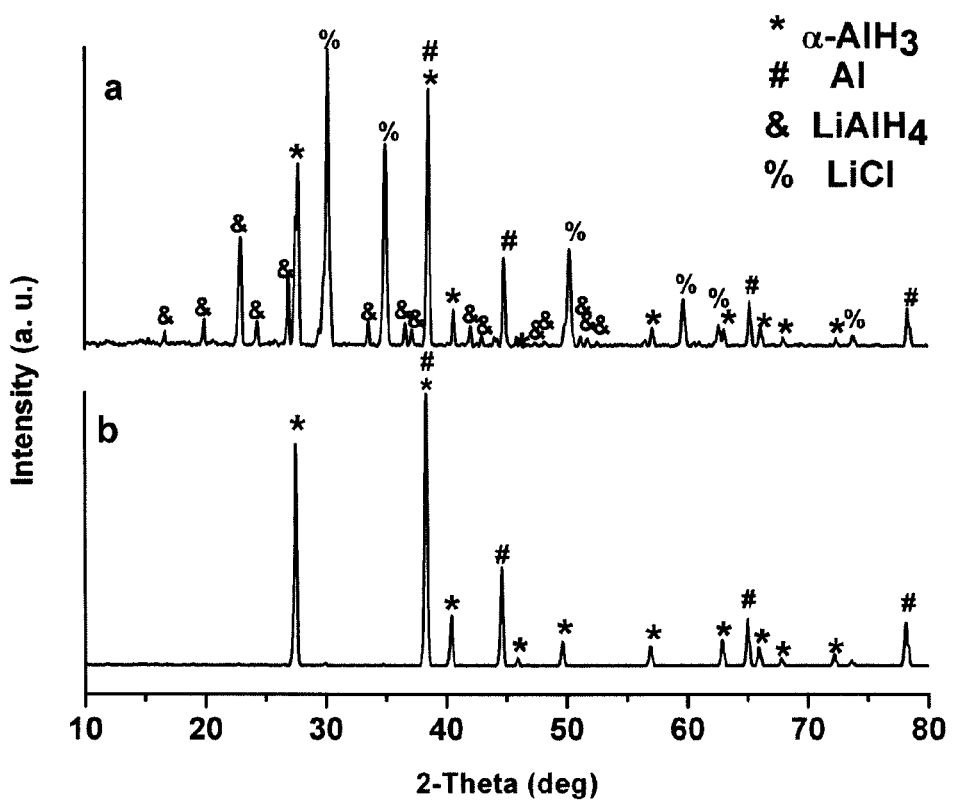
Figure 2 Powder X-ray diffraction of α-AlH₃ from solid-state the reaction between LiAlH₄ and AlCl₃ and heated to 75 °C a) unwashed reaction materials, b) after washing with toluene, ether, and THF. The figure depicts higher yield than material in Figure 1.

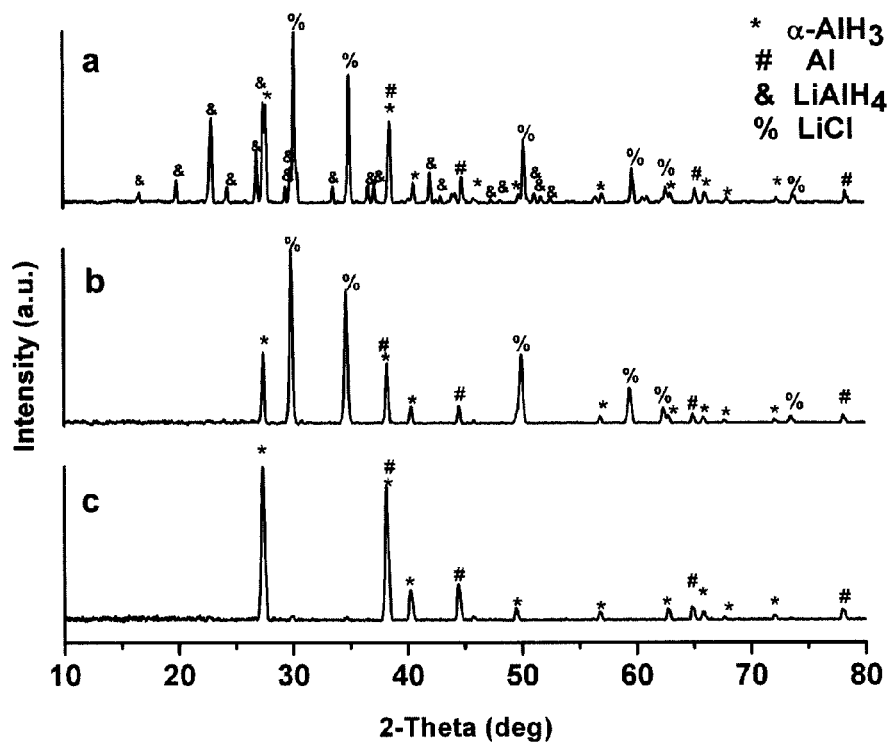
Figure 3 Solid-state synthesis of α-AlH$_3$ from pressing together LiAlH$_4$ and AlCl$_3$ then heated at 75 °C a) unwashed reaction materials, b) after washing with ditheyl ether, c) after washing with THF. Figure 4 shows even higher yield than the previous reactions.

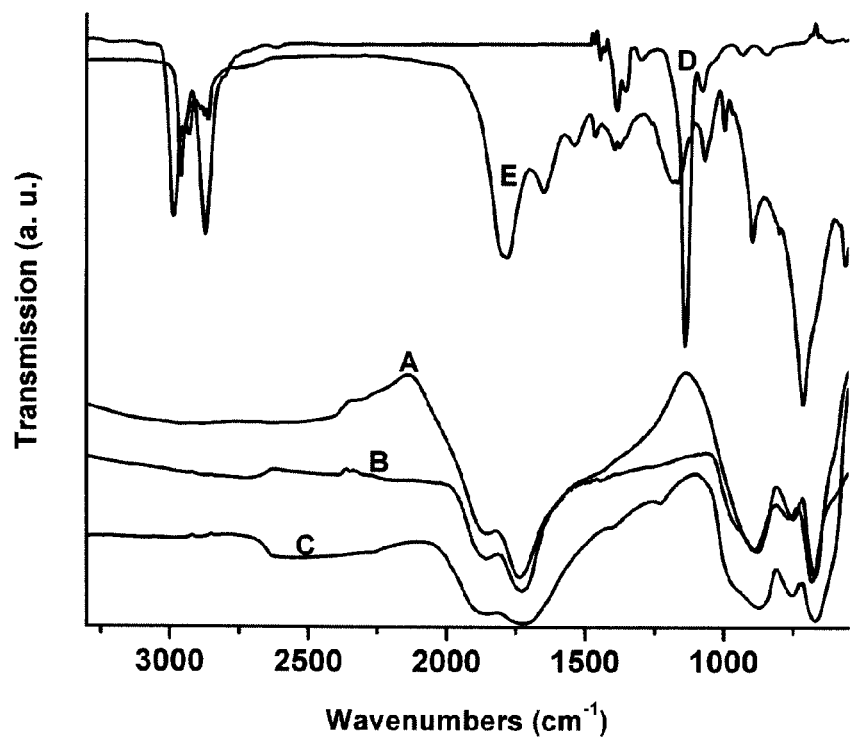
Figure 4 Infrared spectra of α-AlH$_3$ a) pure α-AlH$_3$ from ATK, b) reaction materials after washing with diethyl ether, c) after washing with THF, d) solvent diethyl ether, and e) AlH$_3$2THF adduct.

METHODS FOR SYNTHESIZING ALANE WITHOUT THE FORMATION OF ADDUCTS AND FREE OF HALIDES

RELATED APPLICATIONS

This application claims the benefit of U.S. Provisional Application 61/420,503, filed on Dec. 7, 2010 and which is incorporated by reference herein for all purposes.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards processes and methods to synthesize an alane without the formation of alane adducts as a precursor thereby attaining a crystallized $\alpha$-alane. The methodology allows one to obtain alanes which are free of halides, such as LiCl. The Methodology can also be used to form other high hydrogen capacity materials such as and not limited to $MgAlH_4$ and $CaAlH_4$ without forming adducts and which are free of halides.

BACKGROUND OF THE INVENTION

Suitable solid state hydrogen storage materials to be used in the development of onboard hydrogen-fueled vehicles is of great interest. Among the most promising candidate materials is alane ($AlH_3$) due to its high hydrogen capacity (10.1 wt %) and high volumetric of hydrogen of 149 kg/m$_3$, which is twice that of liquid hydrogen. Although alane is unstable thermodynamically, when in crystalline form it is kinetically metastable at room temperature. The alpha phase of alane ($\alpha$-$AlH_3$) has a Gibbs free energy of formation ($\Delta G°_f$) of 48.5 kJ/mol-$AlH_3$ at 298 K which would make it more likely to exist as elemental Al and $H_2$ according to Eq. (1); however, $\alpha$-$AlH_3$ exists quite readily at room temperature. Consequently, alane can be easily handled and controlled to desorb hydrogen at desirable rates and sufficient temperatures required for optimal fuel cell operation. Beside its potential use in hydrogen-powered cars, alane can also be useful in a wide array of other applications such as reagents in chemical reactions, rocket fuel, and portable power system.

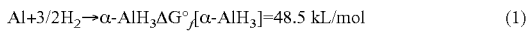

$$Al+3/2H_2 \rightarrow \alpha\text{-}AlH_3 \Delta G°_f[\alpha\text{-}AlH_3]=48.5 \text{ kL/mol} \quad (1)$$

The most direct route to synthesize alane is hydrogenation of aluminum shown in Eq. (1). This method is difficult due to the high $\Delta G°_f$ and would require a $H_2$ pressure greater than 0.7 GPa, the equivalent equilibrium pressure of reaction (1) at room temperature. Literature reviews indicate $AlH_3$ can be generated when aluminum is pressurized with 2.5 GPa hydrogen pressure. It is also possible to generate limited $AlH_3$ crystals from pulverized aluminum and 8.9 GPa $H_2$, at 600° C. It is also possible to generate alane by hydrogenating aluminum at a relatively low pressure in presence of titanium nanoparticles and triethyldiamine (TEDA). However, the difficulty associated with this method is removing TEDA from the $AlH_3$·TEDA adduct to form $AlH_3$.

Presently, industrial quantities of $AlH_3$ are commonly synthesized in solution by a chemical metathesis reaction between $AlCl_3$ and $LiAlH_4$. The reaction proceeds very favorably as shown in Eq. (2). Because $AlH_3$ is thermodynamically unstable at room temperature, the reaction is typically carried out in donating solvents such as ethers or amines in order to stabilize monomeric alane as a solvate $AlH_3$·nL (L=$Et_2O$, amines or THF) as depicted Eq. (3). The solvent is subsequently removed via heating and vacuum pump yielding a stabilized polymeric form of alane $(AlH_3)_n$. In an industrial scale, the removal of solvent adducts by vacuum pump represents a significant energy cost in terms of the electricity being consumed. Moreover, the handling of bulk quantities of the pyrophoric $AlH_3$ etherate adduct and ether solvents is a definite hazard.

Therefore, it is more desirable to have a solid state synthetic route to reaction (2) in which solvents are avoided or limited for use only during workup.

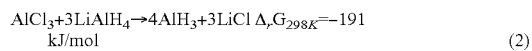

$$AlCl_3 + 3LiAlH_4 \rightarrow 4AlH_3 + 3LiCl \ \Delta_r G_{298K} = -191 \text{ kJ/mol} \quad (2)$$

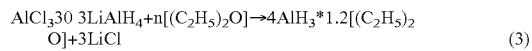

$$AlCl_3 30 \ 3LiAlH_4 + n[(C_2H_5)_2O] \rightarrow 4AlH_3 * 1.2[(C_2H_5)_2O] + 3LiCl \quad (3)$$

Heretofore, direct routes to synthesize alane are not commercially feasible given pressure requirements needed to carry out a reaction at ambient temperatures. Further, current synthesis techniques result in an alane adduct such as alane-etherat adduct. Removal of the ether is an impediment to use of the synthesis techniques in the prior art. Accordingly, there is room for improvement in the art.

SUMMARY OF THE INVENTION

It is one aspect of at least one of the present embodiments to provide for a solid state synthesis route for forming alane which minimizes the requirement of solvents. By minimizing or avoiding solvents, the end product is much more economical for processing on an industrial scale and is a safer material to process.

It is a further aspect of a least one embodiment of the present embodiment to produce an $\alpha$-$AlH_3$ product in which the product is free of any solvent adducts.

These and other features, aspects, and advantages of the present invention will become better understood with reference to the following description and appended claims.

BRIEF DESCRIPTION OF THE DRAWINGS

FIG. 1 is a Powder-X-ray diffraction of $LiAlH_4$ and $AlCl_3$ following ball milling.

FIG. 2 is a Power-X-Ray diffraction of $\alpha$-$AlH_3$ following the reaction and washing with solvents.

FIG. 3 is a Power-X-Ray diffraction studies of the solid-state synthesis of $\alpha$-$AlH_3$ following application of pressure and heat to the reactants.

FIG. 4 show infrared spectra of various reaction materials and controls as set forth in the various examples.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. For example the Methodology can be used to form other high hydrogen capacity materials such as and not limited to $MgAlH_4$ and $CaAlH_4$ without forming adducts and free of halides. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

All procedures involved in the preparation or purification of chemicals are done in an argon-filled glove box or on a Schlenk line. The reactants diethyl ether (anhydrous, Sure/Seal™ 99%), Tetrahydrofuran (anhydrous, Sure/Seal™, 99.9%) and toluene (anhydrous, Sure/Seal™ 99.8%), $AlCl_3$ (anhydrous, ampule, 99.9%) was purchased from Sigma Aldrich and used as received. $LiAlH_4$ (Sigma Aldrich, >97%) was purified prior to use by dissolution in diethyl ether and filtration of a light gray residue. After the solvent was evaporated under a vacuum, a white powder was obtained. According to powder XRD measurements, the material was purely a single phase. IR spectra were collected by Fourier transform IR spectrometer (FTIR, JASCO Co., FT-IR-6300). Inside an inert glove box the solid sample was mixed with KBr and pressed to form a thin pellet and placed between two KBr discs. The discs were then enclosed inside a cell. All measurements were recorded under a nitrogen atmosphere and ambient conditions. TG curves were acquired on a Perkin-Elmer Pyris 1 TGA that was placed inside an argon-filled glove box. The sample was heated from 30-350° C. at a rate of 5° C. per minute.

X-ray diffractions analysis was performed on a Panalytical X-pert Pro with Bragg-Brentano geometry, using Copper Kα1 radiation and a Xcellerator array detector. Source voltage and tube current were 45 kV and 40 mA, respectively. Scans were performed using a 2θ range of 5 to 80 degrees with a step size of 0.017° and a scan speed of 0.4 seconds per step. Patterns were indexed with the Fullprof Suite of programs utilizing TREOR and DICVOL methods. Space group determination was performed using the program Chekcell. The samples were powdered and mounted on a slide and then covered with a Kapton film to prevent air exposure.

EXAMPLE 1

Lithium aluminum hydride ($LiAlH_4$), is ball milled prior to use by placing 15.0 g of $LiAlH_4$ in a ball mill vial with fifteen medium (1.0 g) balls and milled for 30 minutes on a high energy SPEX mill. In an argon-filled glove box, the $LiAlH_4$ (15.0 g, 0.4 mol) is combined with AlCl3 (5.8 g, 0.042 mol) into a clean, dry 500 mL flask with the contents mixed using a stir rod. After mixing well, the flask is closed using a stopper fitted with a ground glass valve. The flask is then heated slowly in an oil bath (ramp to 70° C. in 1.0 hour) while being attached to a Schlenk line and opened to the dry argon on the line. After an additional 1.0 hour isotherm at 70° C. the flask is removed from the oil bath and allowed to cool to room temperature. The resulting solid is returned to the glove box and washed first, with 10 mL of toluene, then second, with 100 mL of diethyl ether, and then finally with 100 mL of THF. The resulting solid is dried under inert atmosphere of the glove box. A 35% yield was obtained based on the $AlCl_3$ used.

EXAMPLE 2

Lithium aluminum hydride ($LiAlH_4$), is ball milled prior to use by placing 15.0 g of $LiAlH_4$ in a ball mill vial with fifteen medium (1.0 g) balls and milled for 30 minutes on a high energy SPEX mill. In an argon filled glove box, the $LiAlH_4$ (15.0 g, 0.4 mol) is combined with $AlCl_3$ (5.8 g, 0.042 mol) into a clean, dry 500 mL flask along with 150 mL of anhydrous toluene. The flask is closed using a stopper fitted with a ground glass valve. The flask is then heated slowly in an oil bath (ramp to 75° C. in 1.0 hour) while being attached to a Schlenk line and opened to the dry argon. After an additional 1.0 hour isotherm at 75° C. the flask is removed from the oil bath and allowed to air cool to room temperature. The resulting solid is collected by filtration while in the glove box and washed first with 100 mL of diethyl ether and then finally with 100 mL of THF. The resulting solid is dried under inert atmosphere of the glove box. A 40% yield was obtained based on the $AlCl_3$ used.

EXAMPLE 3

Lithium aluminum hydride ($LiAlH_4$), is ball milled prior to use by placing 15.0 g of $LiAlH_4$ in a ball mill vial with fifteen medium (1.0 g) balls and milled for 30 minutes on a high energy SPEX mill. In an argon-filled glove box 2.227 g (0.06 mol, 4.0 equiv) of this $LiAlH_4$ was combined with $AlCl_3$ (2.0 g, 0.015 mol) and then mixed well in a mortar-and-pestle. The combined material (3.0 g) was loaded onto a stainless steel cell (1.25 cm in depth and 3.75 cm in diameter). A piece of stainless steel weight with a fitted joint (3.7 cm in diameter) was slotted into the cell's opening and bolted down with 4 screws. The material is compacted by the pressure created by the screws. The entire stainless steel cell was placed inside a Parr reactor vessel. The Parr reactor was heated to 75° C. The temperature was maintained by a temperature controller and carefully monitored by thermocouple wire placed inside the heater. After heating at 75° C. for 2 hours, the apparatus was cooled to room temperature. Inside the glove box, the compacted material was removed from the stainless steel cell and loosened slightly with mortar and pestle. The material was then washed first with 10 mL of toluene, 25 mL of diethyl ether, 25 mL of THF and then finally 10 mL of diethyl ether. The collected material was dried under an inert atmosphere of the glove box. The yield was 60% based on the $AlCl_3$ used. The percent number was calculated from the desorbed $H_2$ content of the recovered product compared to the theoretical $H_2$ content of 100 percent yield.

The total washed product was placed in a 100 mL Schlenk flask and capped with a rubber septum. A thermocouple was inserted through a needle hole. Tygon tubing is connected to the arm of the Schlenk flask and placed in a 100 mL graduated cylinder. The graduated cylinder was inverted and submerged half way in a water container. The product material was then heated to 180° C. The volume of water displaced was used to calculate the total $H_2$ content. Gas expansion was accounted for by one preceding dry run where no product material was used.

Results

Mechanical milling allows the nanoparticle reactants to come in frequent contact, increasing the probability of a chemical reaction and leading to formation of the product phase. Without being limited by theory, it is believed the exchange reaction (Eq. 2) could easily occur in solid state if the reactants are in sufficient contact. Sartori and Buckley have previously reported that ball milling $AlCl_3$ and $LiAlH_4$ can result in the generation of alane. Ball milling at 77 K limits decomposition and allows alane to be separated. Buckley also demonstrated that a solvent nitromethane can be used during work up to remove the LiCl salt by-product from the reaction mixture. In our study, a mixture of $AlCl_3$ and $LiAlH_4$ was cryogenically milled and washed first with toluene, diethyl ether and then THF to remove LiCl and any remaining unreacted reactants. Alane was recovered in sufficient quantity and was analyzed by powder X-ray diffraction (FIG. 1). In the current procedure, THF was shown to be effective in removing LiCl. However, the apparent nanoparticle sizes of the alane formed as a result of ball millling may have facilitated its dissolution in THF and much was filtered away along with the LiCl salt. As reported in M. Paskevicius, D. A. Sheppard, C. E. Buckley, J. Alloys Compd. 487 (2009) 370-376 the use of nitromethane achieved greater success in minimizing the loss of $AlH_3$ during the washing process. However, the synthetic procedure employed had used excess $LiAlH_4$ and thus precluded the use of nitromethane due to the fact that it is highly reactive with $LiAlH_4$.

A different solid state method is preferred, one in which the generated alane have increased particle sizes, reducing its loss during the washing process. Alane of larger particle sizes are also preferred because they have a lower decomposition rate at room temperature. Specifically, $\alpha$-$AlH_3$ is ideally desired because of its crystallite size and has been shown experimentally to be the most stable among the $AlH_3$ polymorphs. $LiAlH_4$ was first ball milled separately in order to remove the surface oxide layer and to enhance its contact with $AlCl_3$. Excess $LiAlH_4$ was mixed well with $AlCl_3$ and then heated in an oil bath. Excess $LiAlH_4$ is essential in stabilizing the forming alane and to facilitate crystal formation. The reaction temperature was ramped slowly and maintained at 75° C. by a temperature-controlled program. The reaction mixture was washed with a solvent regiment that comprised of toluene, diethyl ether and THF. It must also be mentioned that by simply mixing the reactants at room temperature the reaction does not noticeably occur. Heating the reaction to 75° C. drives the reaction forward and simultaneously may aid in the formation of crystalline alpha alane. As can be seen from FIG. 2, the unwashed material showed $\alpha$-$AlH_3$ being formed along with peaks for the expected $LiAlH_4$, LiCl, aluminum and $AlCl_3$. The other alane polymorphs are not apparent in the unwashed material. The washed sample showed only $\alpha$-$AlH_3$ and aluminum which resulted from the dehydrogenation of alane. It must be acknowledged that other alane polymorphs ($\beta$ and $\gamma$) could have formed also but transformed into the $\alpha$-$AlH_3$ polymorph at reaction temperature.

When the reactants were compacted in a stainless-steel cell and then heated to 75° C., 60% overall yield of $\alpha$-$AlH_3$ was recovered after washing. The stainless-steel cell was conceived as a way to compact and create condition for the reactants to come into better contact, thus increase the probability of a chemical reaction. Moreover, the metal structure of the reaction cell serves to transfer heat more effectively and to distribute heat more evenly throughout the reaction mixture. The compacting action of the reaction cell may also function to effect aggregation of the monomeric $AlH_3$ and promote the formation of the stabilized crystalline form of $AlH_3$. $LiAlH_4$ and $AlCl_3$ in 4:1 mole ratio were triturated in a mortar and pestle and the resultant mixture is placed inside the stainless-steel reaction cell. The cell was bolted down to create the compacting effect. The stainless-steel cell was heated inside a Parr reactor while the temperature is maintained at 75° C. for 2 hours. The reacted material was then washed in sequence of toluene, diethyl ether then THF. The only alane polymorph product observed after washing was $\alpha$-$AlH_3$ as shown in FIG. 4(c). Thermogravimetic analysis of the unwashed materials showed 3.5% hydrogen desorption which approaches the theoretical amount of hydrogen from alane if 3 to 1 mole ratio $LiAlH_4$ and $AlCl_3$ are reacted together. The second thermogravimetric event is attributed to the desorption of the residual $LiAlH_4$. The washed material exhibited 6.5% hydrogen desorption. It has one thermogravimetric event between 140-165° C. which corresponds well with TGA of $\alpha$-$AlH_3$ synthesized by others.

An advantage offered by the solid state synthesis presented in this report is the limited use of solvents and a simplified work up. Solvent use was eliminated entirely during reaction thus avoiding the generation of alane adduct. The removal of solvents from alane adducts is often a cumbersome and energy intensive process involving both heating and vacuum pump. By circumventing this process, the synthesis is greatly simplified, reducing significantly the amount of electricity consumed for heating and vacuum pump operation. When solvents are used in this report, they are only utilized for washing during workup. Moreover, the solvents collected at each step during washing can be recycled after distillation. Washing with diethyl ether selectively removes the excess $LiAlH_4$, which can also be recycled. One further washing step with THF removed the LiCl salt by-product leaving the desired $\alpha$-$AlH_3$ and aluminum. The recovered THF can be distilled and reused.

Powder x-ray diffraction patterns in FIG. 3 does not show any solvent adduct of alane. However, the alane adducts are often amorphous and do not appear clearly in powder XRD. Vibrational spectroscopy such as infrared spectroscopy is a more apt tool to detect for the presence of alane adduct. Adducts of alane would invariably contain the signature infrared spectroscopic C—H stretching frequency bands between 2900-3100 $cm^{-1}$ of the adducted organic solvent. As seen in FIG. 4, both diethyl ether (d) and the $AlH_3$*2THF adduct (e) exhibited strong bands in the frequency range 2900-3100 $cm^{-1}$; however, the peaks between 2900-3100 $cm^{-1}$ is characteristically absent in the IR spectra of the $\alpha$-$AlH_3$ products in FIG. 4 (b) and (c). This would indicate strongly that alane adducts did not form during solid state synthesis. It also demonstrates that once monomeric $AlH_3$ polymerizes into crystalline forms such as $\alpha$-$AlH_3$, it is unlikely to react further with solvents to form adducts. As is the case here, washing with organic solvents does not effect adduct formation because the alane product already existed as $\alpha$-$AlH_3$ form, which can be identified from the prewashed sample in FIG. 3 (a). As shown in FIGS. 5b and 5c, Al—H stretching bands at 1857 and 1725 $cm^{-1}$ and A—H bending bands at lower frequencies (874, 740, 673 $cm^{-1}$) are attributed to $\alpha$-$AlH_3$. The IR spectra of the washed samples matched that of the pure $\alpha$-$AlH_3$ sample and correspond well to IR spectroscopic data described in the literature.

Alane is unstable thermodynamically at room temperature; however, it is metastable kinetically. There have been several theories proposed for the origin of this metastabilization. First, due to low surface energy, atomic H existing in bridging Al—H—Al structure may not be able to overcome the activation energy barrier to form molecular $H_2$ [2]. Second, a surface oxide may also play a role in restricting dehydrogenation [4]. As it relates to this study, the underlying nature for this stabilization is rather intriguing. Alane formed during this synthesis could not have developed an $Al_2O_3$ film on its surface as the reaction was conducted in inert atmosphere. The metastabilization in this case may have resulted solely from alane existing in polymeric form $(AlH_3)n$. How monomeric $AlH_3$ oligomerize into $(AlH_3)n$ to gain the stabilization is yet unclear. According to Eq. 1, monomeric $AlH_3$ would have desorbed hydrogen the instant it is formed. Yet, $\alpha$-$AlH_3$ was obtained from the reaction. As such, both LiCl and $LiAlH_4$ could be factors in contributing to the stabilization of the forming $(AlH_3)n$. Reports in the literature have suggested that using excess $LiAlH_4$ is essential in order for alane to be isolated. The stainless steel reactor may also play a role by providing favorable condition in which monomeric $AlH_3$ in proximity to each would oligomerize.

Alane was successfully synthesized in solid state via the reaction (2). Although other solid state syntheses of alane have been reported, it is demonstrated here that alane can be generated by this method at 75° C. The alane synthesized was exclusively the $\alpha$-$AlH_3$ polymorph as observed by X-ray diffraction. The $\alpha$-$AlH_3$ product was obtained from the reaction mixture by a simplified workup procedure that involves washing with organic solvents. Even though solvents were used, the generated $\alpha$-$AlH_3$ did not form solvent adducts thus bypassing the energy intensive desolvation step.

The processes described herein provide for a solid state mixture of $LiAlH_4$ and $AlCl_3$ which are initially ball-milled. The resulting ball-milled solid product is then heated under pressure and at a temperature of between 60-70° C. to form large crystals of a stable alane and LiCl. It is now necessary to carry out the heating and pressing steps after ball-milling in order to have a stable $AlH_3$.

The solid state mixture $LiAlH_4$ and $AlCl_3$ obtained from the ball-milling and pressing step is then stirred and heated at temperatures of between 60-70° C. to obtain a solid mixture $AlH_3$ and LiCl. The mixture is then immersed in a solid which does not react with $AlH_3$ to form adducts. A slurry made of the precursor solids ($LiAlH_4$ and $AlCl_3$) with the non-reactive and non-binding solvent is heated to temperature of between 60-70° C. The solvent may be filtered out to obtain a solid mixture of $AlH_3$ and LiCl which then be dried. Suitable solvents include toluene, benzene, hexane and methylcyclohexane.

Once the solvent is removed, an additional solvent such as THF can be used to remove the LiCl from the mixture leaving a stable alane material. It should be noted that once the alane is crystallized to a micron size particles in the above steps, the alane powder does not thereafter dissolve in THF.

It is important to note that absent the pressing and heating step the alanes which are formed through ball-milling will only be stable for a few days and are difficult to separate in halides such as LiCl. The current methodology allows the more stabilized crystal size and minimizes the hydrogen leaking that occurs from the particles. Further, the larger crystal size has been found to remain stable during the washing steps to remove LiCl, even when using polar solvents such as THF.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention and claims. In addition, it should be understood that aspects of the various embodiments may be interchanged, both in whole, or in part. Therefore, the spirit and scope of the invention should not be limited to the description of the preferred versions contained therein.

The invention claimed is:

1. The process of producing $\alpha$-$AlH_3$ comprising the steps of:
   providing a supply of $LiAlH_4$;
   mechanically milling the $LiAlH_4$ to remove any surface oxide layers;
   combining the $LiAlH_4$ with $AlCl_3$ to form a dry mixture;
   applying a mechanical pressure to the dry mixture;
   heating the dry mixture while maintaining the mechanical pressure to a temperature of about 75° C. and in the presence of a dry inert gas;
   washing the heated mixture with diethyl ether and THF;
   drying the washed mixture with an inert gas, thereby providing an $\alpha$-$AlH_3$ of micron sized particles which is free of adduct.

2. The process according to claim 1 wherein said washing step further comprises the step of washing the dry mixture in a step-wise sequence using toluene, diethyl ether, and THF.

3. The process according to claim 1 wherein the resulting $\alpha$-$AlH_3$ is free of halides.

* * * * *